US012138650B2

(12) United States Patent
Hong et al.

(10) Patent No.: US 12,138,650 B2
(45) Date of Patent: Nov. 12, 2024

(54) APPARATUS FOR EJECTING VISCOUS LIQUID AEROSOL

(71) Applicant: PROTEC CO., LTD., Gyeonggi-do (KR)

(72) Inventors: Seung Min Hong, Seoul (KR); Hansung Lee, Gyeonggi-do (KR); Eui Keun Choi, Seoul (KR); Heejae Jin, Gyeonggi-do (KR)

(73) Assignee: PROTEC CO., LTD., Gyeonggi-do (KR)

( * ) Notice: Subject to any disclaimer, the term of this patent is extended or adjusted under 35 U.S.C. 154(b) by 422 days.

(21) Appl. No.: 17/535,710

(22) Filed: Nov. 26, 2021

(65) Prior Publication Data

US 2022/0193706 A1 Jun. 23, 2022

(30) Foreign Application Priority Data

Dec. 21, 2020 (KR) ........................ 10-2020-0179724

(51) Int. Cl.
*B05B 7/26* (2006.01)
*B05B 7/04* (2006.01)

(52) U.S. Cl.
CPC ............ *B05B 7/262* (2013.01); *B05B 7/0483* (2013.01)

(58) Field of Classification Search
CPC ..... B05B 7/0012; B05B 7/045; B05B 7/0475; B05B 7/0483; B05B 7/262; B05B 12/006
USPC .................................................. 239/338, 370
See application file for complete search history.

(56) References Cited

U.S. PATENT DOCUMENTS

| | | | | |
|---|---|---|---|---|
| 5,916,640 A * | 6/1999 | Liu | B05B 7/0012 239/707 |
| 6,267,301 B1 * | 7/2001 | Haruch | B05B 7/0892 239/290 |
| 6,328,233 B1 * | 12/2001 | Moy | B05B 12/12 239/338 |
| 9,162,449 B2 | 10/2015 | Byun et al. | |
| 2006/0163380 A1 * | 7/2006 | Ahn | B01J 2/04 239/128 |
| 2011/0137268 A1 | 6/2011 | Thomason et al. | |
| 2012/0301613 A1 * | 11/2012 | Doker | B05B 7/12 118/612 |
| 2015/0273499 A1 * | 10/2015 | Preston | B05B 7/045 29/401.1 |
| 2019/0143678 A1 * | 5/2019 | Christenson | B41J 2/175 239/11 |

FOREIGN PATENT DOCUMENTS

| | | | |
|---|---|---|---|
| JP | 10296582 A * | 11/1998 | B05B 7/0012 |
| JP | 2005262108 | 9/2005 | |

(Continued)

*Primary Examiner* — Cody J Lieuwen
(74) *Attorney, Agent, or Firm* — JCIPRNET

(57) ABSTRACT

Provided is an apparatus for ejecting viscous liquid aerosol, and more particularly, an apparatus for ejecting viscous liquid aerosol capable of dispensing a viscous liquid to a work with a fine line width by ejecting the viscous liquid in the form of aerosols. The apparatus for ejecting viscous liquid aerosol may be configured compactly by miniaturizing a device capable of aerosolizing and ejecting viscous liquid in the form of aerosols. In addition, since the apparatus for ejecting viscous liquid aerosol has a structure that is easy to miniaturize, it is easy to uniformly maintain the characteristics of aerosol.

12 Claims, 4 Drawing Sheets

(56) References Cited

FOREIGN PATENT DOCUMENTS

| | | |
|---|---|---|
| JP | 2005305341 | 11/2005 |
| JP | 2006200013 | 8/2006 |
| WO | 2017164565 | 9/2017 |

* cited by examiner

APPARATUS FOR EJECTING VISCOUS LIQUID AEROSOL

CROSS-REFERENCE TO RELATED APPLICATION

This application is based on and claims priority under 35 U.S.C. § 119 to Korean Patent Application No. 10-2020-0179724, filed on Dec. 21, 2020, in the Korean Intellectual Property Office, the disclosure of which is incorporated by reference herein in its entirety.

BACKGROUND

Technical Field

The present disclosure relates to an apparatus for ejecting viscous liquid aerosol, and more particularly, to an apparatus for ejecting viscous liquid aerosol capable of dispensing a viscous liquid to a work with a fine line width by ejecting the viscous liquid in the form of aerosols.

Description of Related Art

In a semiconductor process or an electronic product manufacturing process, a process of dispensing a viscous liquid such as an adhesive or a conductive liquid in an accurate location and with an accurate volume is very important. If there is an error in the dispensing location and volume of viscous liquid, it may cause product defects.

When dispensing viscous liquid to works such as semiconductor devices, components, or substrates, it is important to control the dispensing location and volume. As product specifications increase, the location of dispensing viscous liquid and the dispensing width of viscous liquid are required to be accurate enough to handle within an error of tens to hundreds of micrometers.

In relation to methods of dispensing the viscous liquid as described above, unlike the method of directly dispensing the viscous liquid by a piezoelectric pump or a screw pump commonly used in the prior art, a method of changing the viscous liquid into a form of fine particles such as an aerosol by a spray method and dispensing the same to a work is used. In the case of using such an aerosol method, it is possible to dispense the viscous liquid in a finer and more sophisticated pattern than a method using a conventional pump. By using this method, it is possible to replace the semiconductor process using the conventional mask pattern with the aerosol dispensing method.

In order to dispense the viscous liquid by the aerosol method as described above, an apparatus for ejecting viscous liquid aerosol capable of dispensing the viscous liquid finely and precisely while maintaining the application amount of the aerosol constant is required. In particular, the necessity of configuring a small and compact device capable of aerosolizing viscous liquid and ejecting the aerosolized viscous liquid through a nozzle has increased. By using an apparatus for ejecting viscous liquid aerosol with such a structure and performance, it is possible to dispense viscous liquid to various types of works for various purposes.

SUMMARY

An objective of the present disclosure is to provide an apparatus for ejecting viscous liquid aerosol having a structure that may be manufactured small and compact while having a function of converting viscous liquid into aerosol using compressed gas and dispensing it through a nozzle.

Additional aspects will be set forth in part in the description which follows and, in part, will be apparent from the description, or may be learned by practice of the presented embodiments of the disclosure.

In order to solve the above objective, an apparatus for ejecting viscous liquid aerosol, which ejects a viscous liquid in an aerosol form, of the present disclosure includes a support body; a chamber formed in a container shape to store the viscous liquid and installed in the support body; an atomizer installed on the chamber to convert the viscous liquid stored in the chamber into an aerosol form; an ejection head including a head body installed on the support body, an ejection nozzle formed in the head body to receive and eject the aerosol generated by the atomizer, and an ejection passage formed in the head body to deliver the aerosol to the ejection nozzle; and an operating valve installed in the head body of the ejection head to open and close the ejection passage of the ejection head.

BRIEF DESCRIPTION OF THE DRAWINGS

The above and other aspects, features, and advantages of certain embodiments of the disclosure will be more apparent from the following description taken in conjunction with the accompanying drawings, in which.

DESCRIPTION OF THE EMBODIMENTS

Figure 1:
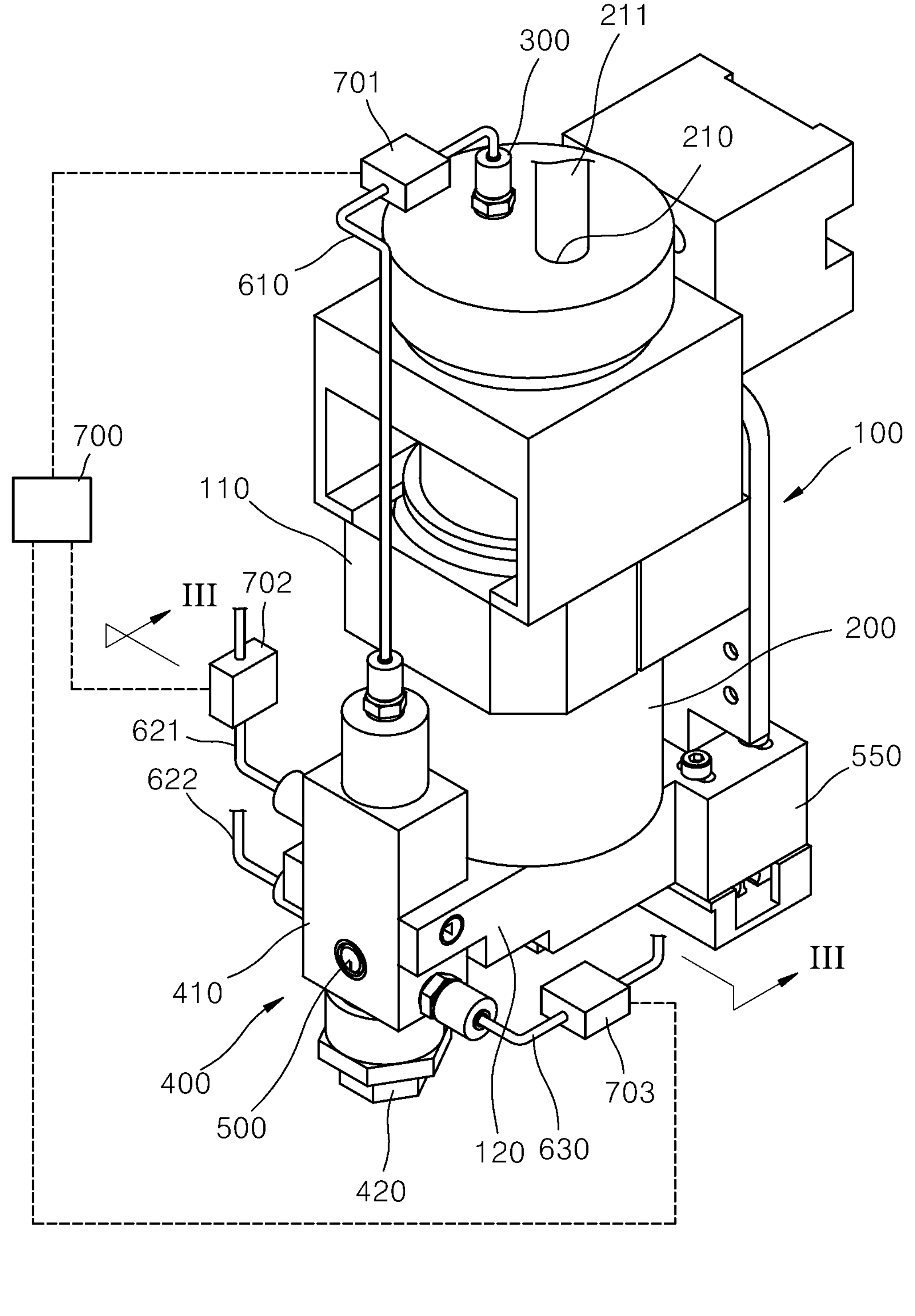
FIG. 1 is a perspective view of an apparatus for ejecting viscous liquid aerosol according to an embodiment of the present disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. Hereinafter, with reference to the accompanying drawings, an apparatus for ejecting viscous liquid aerosol according to an embodiment of the present disclosure will be described.

Figure 2:
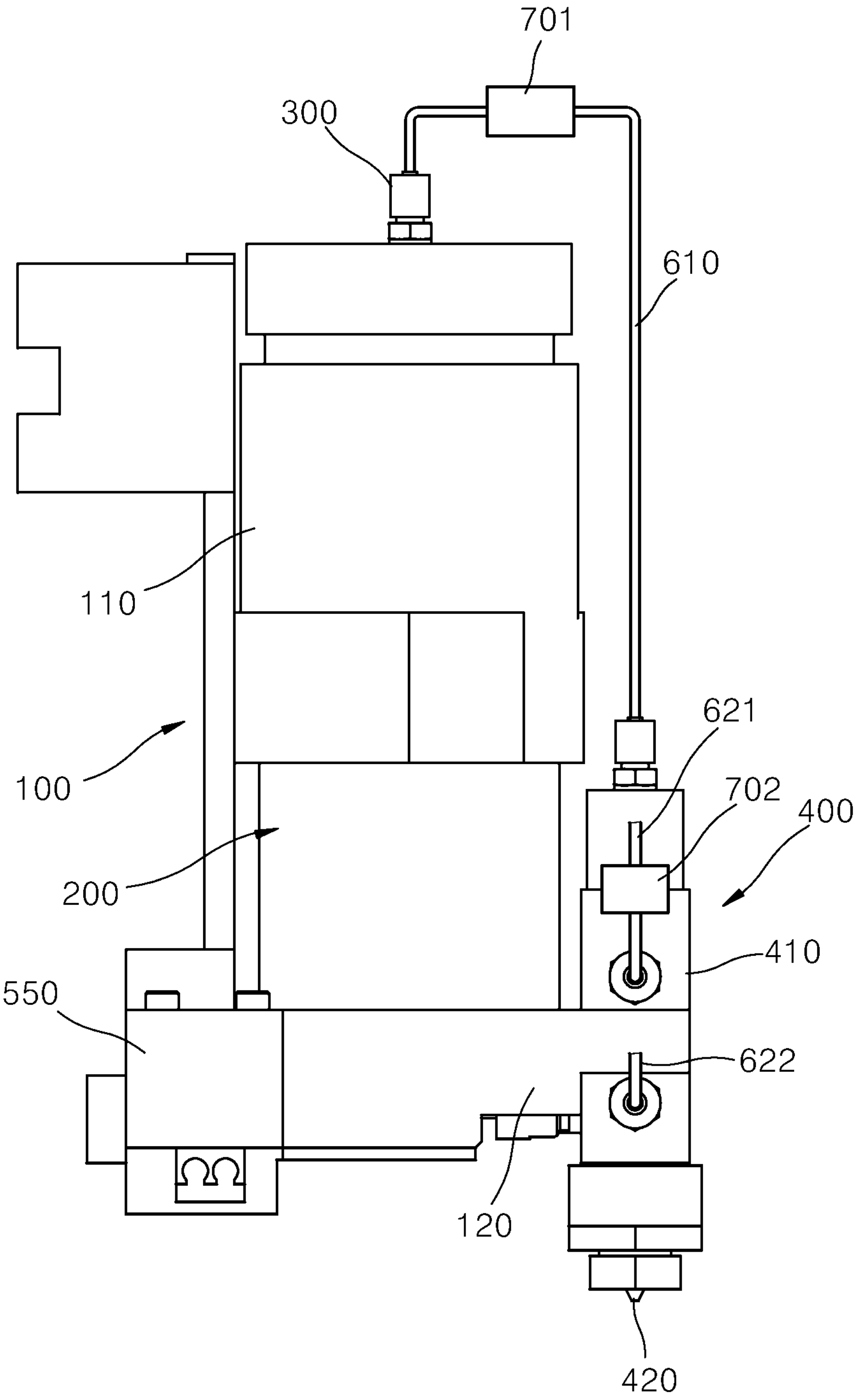
FIG. 2 is a side view of the apparatus for ejecting viscous liquid aerosol illustrated in FIG. 1.

FIG. 1 is a perspective view of an apparatus for ejecting viscous liquid aerosol according to an embodiment of the present disclosure, and FIG. 2 is a side view of the apparatus for ejecting viscous liquid aerosol illustrated in FIG. 1.

Referring to FIGS. 1 and 2, an apparatus for ejecting viscous liquid aerosol of this embodiment includes a support body 100, a chamber 200, an atomizer 300, an ejection head 400, and an operating valve 500.

The support body 100 serves to support and fix the overall configuration of the apparatus for ejecting viscous liquid aerosol according to this embodiment. An apparatus using the apparatus for ejecting viscous liquid aerosol of this embodiment applies viscous liquid of a fine line width to a work disposed on a lower side while transporting the support body 100 back and forth, left and right and up and down.

The support body 100 includes a chamber seat 110 and a head seat 120. The chamber seat 110 is formed so that the chamber 200 to be described later may be seated and fixed, and the head seat 120 is formed so that the ejection head 400 to be described later may be seated and fixed.

The chamber 200 is formed in a container shape. The viscous liquid made of synthetic resin is stored in the chamber 200. The viscous liquid stored in the chamber 200 is aerosolized (atomized) and ejected through an ejection nozzle 420.

In this embodiment, a portion of the chamber 200 is formed in a transparent container shape. Due to this structure, a user may easily check the remaining volume of the viscous liquid stored in the chamber 200 with the naked eye. The chamber 200 is seated and fixed to the chamber seat 110 of the support body 100 as described above.

An inlet 210 is formed in the chamber 200. A gas supply conduit 211 supplying compressed gas is connected to the inlet 210 of the chamber 200. The compressed gas is supplied into the chamber 200 through the gas supply conduit 211, and pressure inside the chamber 200 rises. In this embodiment, nitrogen gas is compressed and supplied into the chamber 200 through the gas supply conduit 211.

The atomizer 300 is installed on the chamber 200. In the case of this embodiment, as illustrated in FIG. 1, the atomizer 300 is installed on a cover part of the chamber 200. The atomizer 300 converts the viscous liquid into the aerosol form using compressed nitrogen supplied into the chamber 200 through the gas supply conduit 211 and the viscous liquid stored in the chamber 200. The atomizer 300 composed of a vacuum ejector form generates the aerosol composed of a fine particle form by misting the viscous liquid using a principle of generating a spray.

The aerosol generated by the atomizer 300 is delivered to the ejection head 400 through a supply conduit 610. The ejection head 400 serves to eject the aerosol delivered from the atomizer 300 through the supply conduit 610 with the fine line width through the ejection nozzle 420.

The ejection head 400 includes a head body 410, the ejection nozzle 420 and a supply passage 430 and an ejection passage 440 and a sheath passage 470 and a first discharge passage 451 and a second discharge passage 452.

The head body 410 of the ejection head 400 is seated and fixed to the head seat 120 of the support body 100 as described above.

The supply passage 430, the ejection passage 440, the sheath passage 470, the first discharge passage 451 and the second discharge passage 452 are formed in the head body 410.

Figure 3:
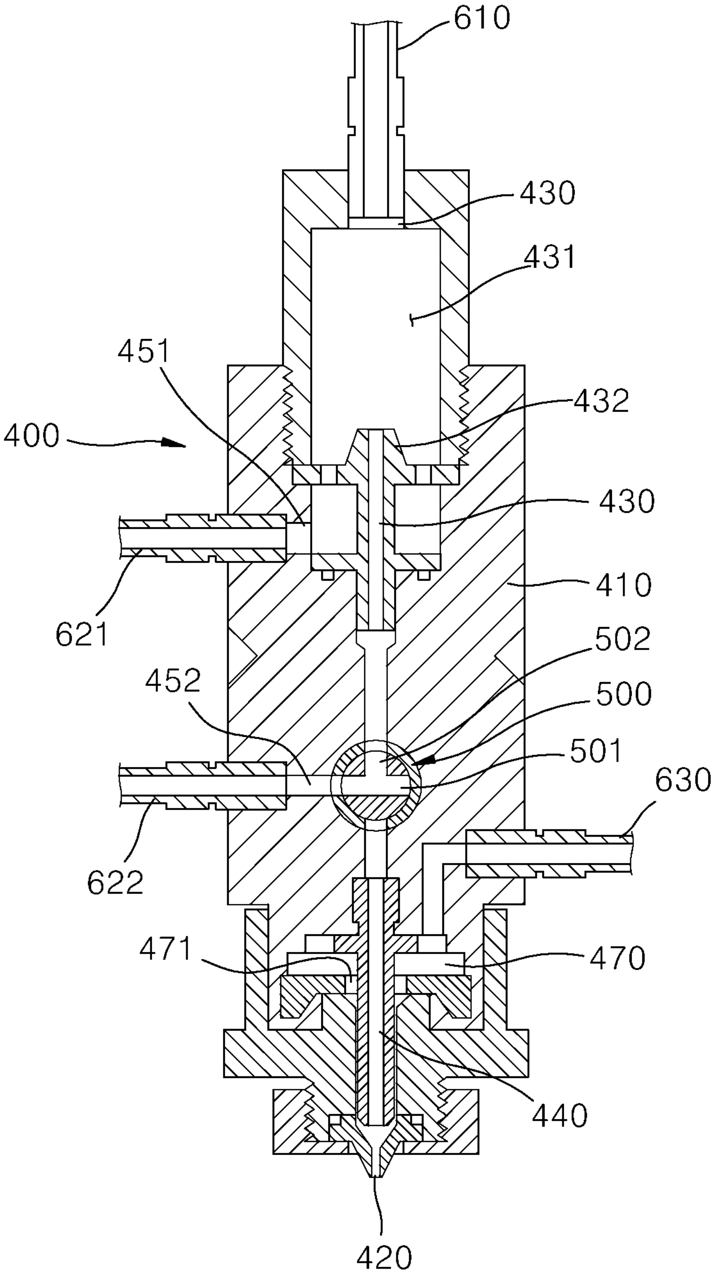
FIGS. 3 and 4 are cross-sectional views taken along line III-III of the apparatus for ejecting viscous liquid aerosol illustrated in FIG. 1.

Referring to FIG. 3, the supply passage 430 is formed in a central portion of the head body 410 to extend up and down. The supply conduit 610 is connected to the supply passage 430 to receive the aerosol generated by the atomizer 300. The ejection passage 440 is formed in the head body 410. The ejection passage 440 is connected to the supply passage 430 and is formed to extend up and down to deliver the aerosol. The ejection nozzle 420 is formed at an end of the ejection passage 440. The aerosol passing through the ejection passage 440 is ejected to an outside through the ejection nozzle 420.

A supply cavity 431 is formed in the head body 410 of the ejection head 400. The supply cavity 431 is formed so that the supply passage 430 expands on the path of the supply passage 430. That is, a cavity of a predetermined space formed by extending the supply passage 430 inside the head body 410 is formed. A part of the aerosol stays in the space of the supply cavity 431. In addition, a supply protrusion 432 formed to protrude and extend toward an inside (in the case of this embodiment, upward) of the supply cavity 431 is formed in the head body 410 as illustrated in FIG. 3. In the supply protrusion 432, the supply passage 430 is formed so as to extend along a direction in which the supply protrusion extends 432 from an upper portion of the supply cavity 431. In the case of the supply protrusion 432 of this embodiment, an outer peripheral surface is formed as a tapered inclined surface, so that an outer diameter increases toward the lower side.

The first discharge passage 451 branching from the supply passage 430 is formed in the head body 410. In this embodiment, the first discharge passage 451 is formed to extend from a lower portion of the supply cavity 431 to an outer surface of the head body 410 as illustrated in FIG. 3. The first discharge passage 451 is connected to a first discharge conduit 621. A part of the aerosol passing through the supply cavity 431 is discharged to an outside through the first discharge conduit 621.

Due to the structure of the supply cavity 431, the supply passage 430 and the first discharge passage 451, some of the aerosol that entered the supply cavity 431 through the supply passage 430 is discharged to the first discharge passage 451 and the rest is transferred to the ejection passage 440.

The operating valve 500 is installed in a part where the supply passage 430 and the ejection passage 440 of the head body 410 are connected. The operating valve 500 opens and closes the ejection passage 440. In this embodiment, the operating valve 500 is rotatably installed on the head body 410 as illustrated in FIG. 3.

Figure 4:
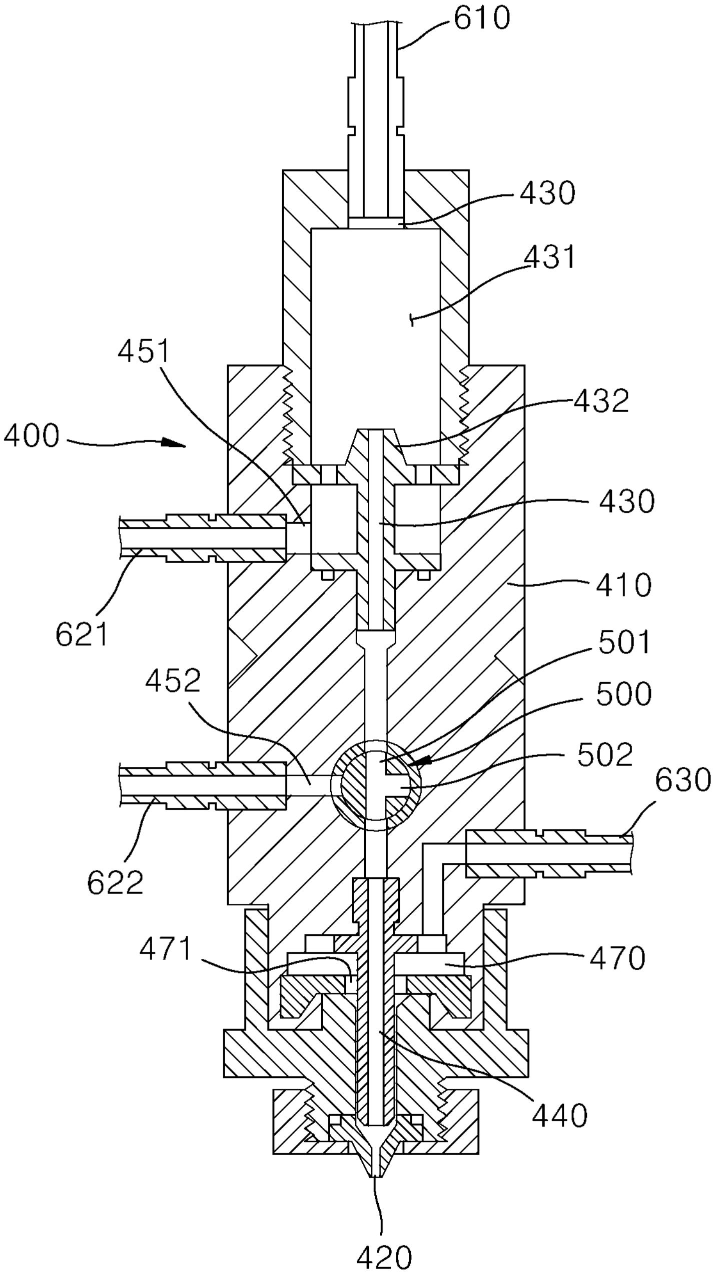

In addition, the second discharge passage 452 branching from the supply passage 430 at a location of the operating valve 500 is formed in the head body 410. That is, the operating valve 500 serves to selectively connect the ejection passage 440 and the second discharge passage 452 to the supply passage 430 according to an operating state. As illustrated in FIGS. 3 and 4, a T-shaped passage is formed in the operating valve 500. That is, a first passage 501 formed to pass through the operating valve 500 and a second passage 502 vertically branched from the first passage 501 are formed in the operating valve 500.

Using the T-shaped passage of the operating valve 500, the operating valve 500 selectively connects the supply passage 430 to either one of the ejection passage 440 and the second discharge passage 452 according to a rotational angular displacement.

A second discharge conduit 622 is connected to the second discharge passage 452 of the ejection head 400. The aerosol delivered to the second discharge passage 452 is discharged to an outside through the second discharge passage 452.

Meanwhile, the operating valve 500 is rotated by a valve operating member 550 to adjust the angular displacement. In this embodiment, the valve operating member 550 is configured in the form of a pneumatic actuator. The valve operating member 550 is installed on the support body 100 and connected to the operating valve 500.

Depending on air pressure delivered to the valve operating member 550, the valve operating member 550 rotates the operating valve 500 to an angle limited by a stopper.

Referring to FIG. 3, the sheath passage 470 is formed in the head body 410 of the apparatus for ejecting viscous liquid aerosol according to the present embodiment. The sheath passage 470 is formed to be connected with the ejection passage 440 at a location adjacent to the ejection nozzle 420. A plurality of sheath nozzles 471 are formed in the path of the sheath passage 470 of the head body 410. That is, the compressed gas supplied to the sheath passage 470 is converted into a relatively uniform flow along the circumferential direction through the sheath nozzle 471 and delivered to the ejection passage 440.

In this embodiment, a lower end portion of the sheath passage 470 is formed to be inclined downward toward a center of the ejection nozzle 420. In this embodiment, six sheath nozzles 471 are arranged at equal angular intervals along the circumferential direction around the ejection passage 440. Compressed gas flowing into the sheath passage 470 is uniformly distributed by the six sheath nozzles 471 and ejected toward the ejection nozzle 420. As such, the compressed gas ejected from the lower end portion of the sheath passage 470 toward the ejection nozzle 420 prevents the spread of aerosol ejected through the ejection nozzle 420 to eject the viscous liquid of the fine line width.

A sheath conduit 630 is connected to the sheath passage 470 of the ejection head 400. High-pressure nitrogen gas or air is supplied to the sheath passage 470 through the sheath conduit 630.

Meanwhile, mass flow controllers (MFCs) 701, 702, and 703 are respectively installed in the supply conduit 610, the first discharge conduit 621 and the sheath conduit 630. As such, the mass flow controllers 701, 702, and 703 respectively installed in the supply conduit 610, the first discharge conduit 621 and the sheath conduit 630 are controlled by a control unit 700. That is, the mass flow controllers 701, 702, and 703 controls the flow rates of the fluid flowing through the supply conduit 610, the first discharge conduit 621 and the sheath conduit 630 with the flow rates set by the control unit 700, respectively. The control unit 700 controls the flow rate of the aerosol ejected through the ejection nozzle 420 by adjusting the flow rate of the fluid flowing through the supply conduit 610, the first discharge conduit 621 and the sheath conduit 630, and controls the line width of the pattern dispensed to the work by the aerosol.

Hereinafter, the operation of the apparatus for ejecting viscous liquid aerosol configured as described above will be described.

First, when the compressed nitrogen is supplied into the chamber 200 through the gas supply conduit 211, the aerosol is generated in the atomizer 300 by the pressure of nitrogen. The viscous liquid stored in the chamber 200 is supplied to the atomizer 300 with the nitrogen gas and converted into the aerosol of the fine particles.

The aerosol generated by atomizer 300 is delivered to the supply passage 430 of the ejection head 400 through the supply conduit 610. As described above, since the mass flow controller 701 is installed in the supply conduit 610, the flow rate of the aerosol flowing into the supply conduit 610 is adjusted according to the value set in the control unit 700.

The aerosol introduced into the supply passage 430 is delivered to the space of the supply cavity 431 formed in the middle of the supply passage 430. As described above, the first discharge passage 451 is formed in the supply cavity 431, and the mass flow controller 702 is installed in the first discharge conduit 621 connected to the first discharge passage 451. Therefore, the flow rate of the aerosol to flow to the supply passage 430 of the supply protrusion 432 is determined by the flow rates of the supply conduit 610 and the first discharge conduit 621 set by the control unit 700.

On the other hand, as described above, due to a space formed by the supply cavity 431, the supply protrusion 432 formed to protrude into the space, and a tapered structure formed on the outer periphery of the supply protrusion 432, relatively large sized aerosol particles is discharged to the first discharge passage 451, and only relatively small sized aerosol particles are delivered to the supply passage 430 of the supply protrusion 432.

The aerosol discharged to the first discharge conduit 621 is collected and discarded by a separate collection device.

The aerosol proceeding along the supply passage 430 passes through the operating valve 500. As described above, the operating valve 500 is rotated by the valve operating member 550 to adjust the path of the aerosol. When the T-shaped passage formed in the operating valve 500 is in a state as illustrated in FIG. 3, the first passage 501 and the second passage 502 of the operating valve 500 connect the supply passage 430 and the second discharge passage 452 and close the ejection passage 440. In this case, all aerosol supplied to the supply passage 430 is transferred to the second discharge conduit 622 along the second discharge passage 452. The aerosol delivered to the second discharge conduit 622 is collected and discarded by a separate collection device like the first discharge conduit 621.

When An apparatus using the apparatus for ejecting viscous liquid aerosol of this embodiment is in an idle state in which no aerosol is dispensed to the work or a standby state before performing the application operation, as described above, the operating valve 500 is at an angle as illustrated in FIG. 3 so that all aerosol flows only through the second discharge passage 452.

Next, when the valve operating member 550 rotates the operating valve 500 at an angle as illustrated in FIG. 4, all aerosol flowing along the supply passage 430 is ejected through the first passage 501 of the operating valve 500, the ejection passage 440 and the ejection nozzle 420.

By properly forming the size of the ejection nozzle 420, the line width of the viscous liquid in the aerosol form that may be dispensed to the work such as a substrate by is controlled. When the apparatus using the apparatus for ejecting viscous liquid aerosol of this embodiment ejects the aerosol through the ejection nozzle 420 while moving the apparatus for ejecting viscous liquid aerosol in the horizontal direction, it is possible to dispense a viscous liquid pattern with a fine line width to the work. Unlike a pump that directly applies a viscous liquid, such as a piezoelectric pump or a screw pump, the apparatus for ejecting viscous liquid aerosol of the present disclosure may easily dispense the viscous liquid pattern having the fine line width dramatically.

In addition, when the aerosol is focused by ejecting the compressed gas around the ejection nozzle 420 through the sheath passage 470 and the sheath nozzle 471 as described above, the apparatus for ejecting viscous liquid aerosol of the present disclosure may dispense the viscous liquid more finely and precisely.

As described above, the compressed nitrogen supplied through the sheath conduit 630 passes through the sheath nozzle 471 while flowing through the sheath passage 470. As described above, the sheath nozzle 471 is arranged at equal angular intervals along the circumferential direction around the ejection passage 440, and the lower end portion of the sheath passage 470 is arranged to be inclined with respect to the direction of the ejection nozzle 420. Therefore, the nitrogen gas ejected from the sheath passage 470 prevents the aerosol ejected from the ejection nozzle 420 from spreading and helps to be ejected with a narrower width. In addition, by preventing the aerosol ejected from the ejection nozzle 420 from being in contact with a wall surface of the ejection nozzle 420 due to the compressed nitrogen ejected from the lower end portion of the sheath passage 470, the apparatus for ejecting viscous liquid aerosol of the present disclosure may improve quality of an aerosol ejecting process.

Like the supply conduit 610 and the first discharge conduit 621 described above, the mass flow controller 703 is installed in the sheath conduit 630, so the control unit 700 controls a ejection characteristic of the aerosol ejected through the ejection nozzle 420 by adjusting the flow rate of the nitrogen gas supplied through the sheath conduit 630 to an appropriate value.

On the other hand, since the apparatus for ejecting viscous liquid aerosol of the present disclosure has a structure in which the chamber 200 and the ejection head 400 are installed in the support body 100 in which the chamber seat 110 and the head seat 120 are formed as described above, the apparatus for ejecting viscous liquid aerosol as a whole may be configured in a small and compact manner. Due to such a structure, it is possible to configure distance between the ejection head 400 in which the aerosol is ejected and the chamber 200 and the atomizer 300 in which the aerosol is generated to be short. Due to this structure, the length of the supply conduit 610 may be shortened, and consequently, it may be prevented that the pressure of the compressed gas and the aerosol in the supply conduit 610 and the supply passage 430 is lowered. In addition, as the length of the supply conduit 610 is shortened, possibility that the aerosol particles are combined with each other and the size of the aerosol particles becomes non-uniform may be low. By keeping the particle size of the aerosol small and uniform as described above, the apparatus for ejecting viscous liquid aerosol of the present disclosure may perform a sophisticated viscous liquid application operation.

In addition, as described above, by configuring at least a portion of the chamber 200 transparently, the user may easily grasp and replenish the remaining amount of the viscous liquid.

As described above, preferred examples of the present disclosure have been described, but the scope of the present disclosure is not limited to the above-described and illustrated forms.

For example, the chamber 200 has been described as being formed at least partially transparently, but it is also possible to configure the chamber with an opaque material. In some cases, it is also possible to configure the apparatus for ejecting viscous liquid aerosol so that the control unit may detect the remaining amount of the viscous liquid stored in the chamber by installing a level sensor in the chamber.

In addition, the gas for generating the aerosol and the gas supplied through the sheath conduit 630 have been described as using nitrogen gas, but it is possible to use other gas such as air instead of nitrogen gas. When performing a viscous liquid application operation related to sophisticated and precise semiconductor components, nitrogen gas that is chemically stable and prevents corrosion of metal materials may be used. However, when such delicate management is not required, it is also possible to use air as the compressed gas.

In addition, the valve operating member 550 for rotating the operating valve 500 has been described as using the pneumatic actuator, but it is possible to use a configuration other than the pneumatic actuator as the valve operating member. For example, a motor may be used as the valve operating member.

In addition, although the operating valve 500 has been described as having the T-shaped passage as illustrated in FIGS. 3 and 4, it is also possible to use an operating valve having a passage having a different structure. In addition, as described above, it is also possible to use an operating valve having various other structures in addition to the structure that rotates with respect to the head body.

In addition, although it has been previously described that the mass flow controllers 701, 702, and 703 are installed in the supply conduit 610, the first discharge conduit 621 and the sheath conduit 630, respectively, the mass flow controller may be installed only in some of the supply conduit 610, the first discharge conduit 621 and the sheath conduit 630. In addition, the mass flow controller may be installed in a part other than the location as described above. In addition, it is possible to adjust the flow rate of the some conduit by installing a valve or a flow controller other than the mass flow controller.

The apparatus for ejecting viscous liquid aerosol of the present disclosure may be configured compactly by miniaturizing a device capable of aerosolizing and ejecting viscous liquid in the form of aerosols.

In addition, since the apparatus for ejecting viscous liquid aerosol of the present disclosure has a structure that is easy to miniaturize, it is easy to uniformly maintain the characteristics of aerosol.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. An apparatus for ejecting viscous liquid aerosol that ejects a viscous liquid in an aerosol form, the apparatus for ejecting viscous liquid aerosol comprising:

a support body;

a chamber formed in a container shape to store the viscous liquid and installed in the support body;

an atomizer installed on the chamber to convert the viscous liquid stored in the chamber into an aerosol form;

an ejection head comprising:

a head body installed on the support body, an ejection nozzle formed in the head body to receive and eject the aerosol generated by the atomizer, and an ejection passage formed in the head body to deliver the aerosol to the ejection nozzle; and an operating valve installed in the head body of the ejection head to open and close the ejection passage of the ejection head, wherein the ejection head further comprises a sheath passage formed in the head body to be connected to the ejection passage at a position adjacent to the ejection nozzle to eject compressed gas to prevent spread of the aerosol ejected through the ejection nozzle, wherein the support body comprises a chamber seat formed such that the chamber is seated thereon and a head seat formed so that the ejection head is seated, the chamber is seated on the chamber seat of the support body so as to be installed on the support body, and the ejection head is seated on the head seat of the support body so as to be installed on the support body, wherein the ejection head further comprises a supply passage formed in the head body to receive and deliver the aerosol generated by the atomizer to the ejection passage, a supply conduit configured to connect the atomizer with the supply passage of the ejection head, and a sheath conduit configured to deliver the compressed gas to the sheath passage of the ejection head, wherein the ejection head further comprises a first discharge passage formed in the head body to branch from the supply passage, the operating valve is rotatably installed on the head body of the ejection head to selectively connect the supply passage to any one of the ejection passage and a second discharge passage or to close the supply passage, according to rotational angular displacement, and a second discharge conduit connected to the second discharge passage of the ejection head is further provided.

2. The apparatus for ejecting viscous liquid aerosol of claim 1, wherein the ejection head further comprises a first discharge conduit connected to the first discharge passage of the ejection head.

3. The apparatus for ejecting viscous liquid aerosol of claim 2, wherein a mass flow controller (MFC) is installed in each of the sheath conduit and the first discharge conduit, and a control unit configured to control an operation of the mass flow controller installed in each of the sheath conduit and the first discharge conduit is further provided.

4. The apparatus for ejecting viscous liquid aerosol of claim 3, wherein a mass flow controller is also installed in the supply conduit, and the control unit also controls an operation of the mass flow controller installed in the supply conduit.

5. The apparatus for ejecting viscous liquid aerosol of claim 1, wherein the ejection head further comprises a supply cavity formed in the head body to expand the supply passage on the path of the supply passage, and the first discharge passage of the ejection head is formed to be connected to the supply cavity.

6. The apparatus for ejecting viscous liquid aerosol of claim 5, wherein the ejection head further comprises a supply protrusion formed in the head body to protrude and extend toward the inside of the supply cavity on the path of the supply passage, and the supply passage of the ejection head is formed to be continuous from an end of the supply protrusion along a direction in which the supply protrusion extends.

7. The apparatus for ejecting viscous liquid aerosol of claim 1, further comprising:

a valve operating member connected to the operating valve to rotate the operating valve to operate.

8. The apparatus for ejecting viscous liquid aerosol of claim 7, wherein the valve operating member is installed on the support body.

9. The apparatus for ejecting viscous liquid aerosol of claim 7, wherein the valve operating member is formed as a pneumatic actuator rotating the operating valve with air pressure.

10. The apparatus for ejecting viscous liquid aerosol of claim 1, wherein the ejection head further comprises a plurality of sheath nozzles arranged at equal angular intervals in the circumferential direction with respect to the ejection passage and formed in the head body to be disposed on the path of the sheath passage.

11. The apparatus for ejecting viscous liquid aerosol of claim 1, wherein at least a portion of the chamber is formed to be transparent.

12. The apparatus for ejecting viscous liquid aerosol of claim 1, wherein the atomizer converts the viscous liquid into the aerosol form using nitrogen gas, and the ejection head ejects nitrogen gas as the compressed gas through the sheath passage.

* * * * *